Aug. 18, 1953     L. C. HARBERT ET AL     2,649,082
ENGINE COOLING SYSTEM UTILIZING WASTE HEAT
Filed June 3, 1950     2 Sheets-Sheet 2

LLOYD C. HARBERT
WILLIAM G. COREY
INVENTORS

BY

ATTORNEYS

Patented Aug. 18, 1953

2,649,082

UNITED STATES PATENT OFFICE 2,649,082

ENGINE COOLING SYSTEM UTILIZING WASTE HEAT

Lloyd C. Harbert, Los Angeles, and William G. Corey, Altadena, Calif., assignors to Engineering Controls, Inc., Los Angeles, Calif., a corporation of California Application June 3, 1950, Serial No. 165,974

12 Claims. (Cl. 123—41.25)

1

The present invention relates to an improved arrangement for cooling internal combustion engines of the type in which the cooling fluid is heated to a boiling temperature in the cooling jacket of the engine.

Heretofore, internal combustion engines have been operated with the cooling fluids heated to boiling temperatures to achieve many important results, some of which may be mentioned, such as (1) the reduction in erosion or wear of the movable engine parts occasioned by the absence of condensate in the combustion chamber, (2) allowing the use of low grade fuel such as sewage gases to drive the engine, (3) the repeated use of the same cooling fluid without the possibility of losing any of the same due to boiling, as well as other results. In such systems, the cooling fluid, usually water, leaves the engine jacket at steam temperatures and enters a flash boiler or steam separator, and then the cooling liquid is returned to the engine jacket either by gravity or under the influence of a pump, the steam being allowed to enter the atmosphere or to enter a condenser with the condensate returned to the engine jacket, or the steam may be used to perform some useful purpose such as heating before entering the condenser or while in the process of being condensed.

Oftentimes, the condenser for accomplishing its intended purpose of reducing the steam to condensate requires auxiliary fans for cooling the same, the fans being driven by electric motors supplied with electric current from a conveniently located power line or generated locally. In the latter instance, in those installations wherein the engine drove an electric generator some of the electric current generated was utilized to drive the fan motor, with a resulting loss in efficiency. However, in certain installations such as in oilfield operations, where the engine is used for purposes other than driving a generator and no commercial source of electric power is available, other means must be used to drive the cooling fan; for example, the fan may be driven from a power take off shaft of the engine, or an auxiliary gas engine may be provided for that purpose, both of these two means being relatively expensive.

In accordance with an important aspect of the present invention, the steam produced in operation of the engine is utilized to drive a turbine, the output shaft of which mounts a fan for cooling the condenser to thereby obviate the necessity of the use of a source of electric current, as well as to achieve other important objects and results described hereinafter.

2

In accordance with another important aspect of the present invention, the flow of cooling air for the condenser in a system of this character is not induced unless steam is formed by the heat developed in the cooling jacket of the engine, and the rate of flow of such cooling air is proportioned to the power developed in the engine.

It is therefore an object of the present invention to provide an improved system of this character in which at least some of the steam generated in cooling the engine is utilized to drive a low pressure turbine having an output shaft to which is secured a fan arranged to direct the stream of cooling air over the condenser, to thereby minimize the cost, space requirements and efficiency of the system.

Another object of the present invention is to provide an improved inexpensive system of this character which may be operated in localities where a commercial power line is not available, and where the engine serves purposes other than driving an electric generator.

Another object of the present invention is to provide an improved system of this character wherein the condenser is not subjected to an induced stream of cooling air unless the temperature of the cooling fluid is sufficiently high to produce steam, a subsidiary feature being that, after the production of steam, the rate of air flow past such condenser is dependent upon the power developed in the engine whereby the effectiveness of the condenser, as such, is improved with increased loading of the engine in that, when and as the loading increases, the amount of steam generated increases to tend to increase the steam or back pressure in the steam separator, but such increased steam pressure results in increased speed of a steam turbine driven fan which serves to cool the condenser in increased amount whereby such tendency for the steam or back pressure to increase is counteracted by increased cooling of the condenser.

Another object of the present invention is to provide an improved system of this character wherein the flow of cooling air past the condenser is assured after the engine is shut down, a subsidiary feature being that the amount of such air flow is dependent upon the quantity or pressure of the steam generated.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
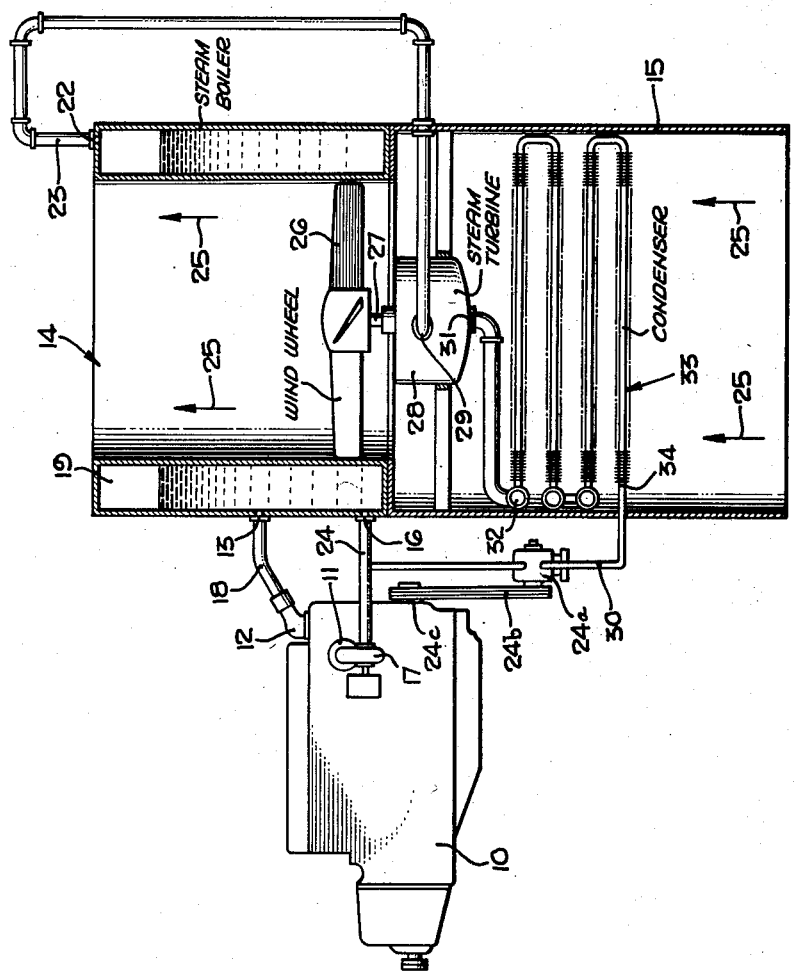
Figure 1 shows a system embodying features of the present invention.

Referring to the system shown in Figure 1, the internal combustion engine 10 has a conventional cooling jacket, such jacket having a water inlet 11 and a water outlet 12. The outlet 12 is in communication with the inlet 13 of the steam separator 14, which is generally cylindrical or tubular and rests upon the frame 15. The water outlet 16 of such separator 14 is in communication with the inlet side of the circulating pump 17, which has its outlet in communication with the water jacket inlet 11. The heat developed in the water jacket of the engine, while running normally loaded or unloaded, is sufficient to cause the temperature of the water leaving the outlet 12 to be at steam temperatures. Thus, there is a mixture of water and steam in the separator 14, with the steam occupying the upper part of annular space 19. Steam passes out of the steam outlet 22 into the conduit 23 for purposes described in detail hereinafter.

A cooling liquid circuit through the engine thus comprises, in this order, the jacket of the engine 10, the conduit 18, the lower portion of separator 14, the conduit 24 connecting the outlet 16 to the pump inlet, the pump 17, and returning to the jacket of the engine.

The steam after it leaves the separator 14 passes, in turn, through the conduit 23, low pressure steam turbine 28, condenser 33, wherein the steam is condensed and the resulting condensate is returned from the lower portion of the condenser to the conduit 24 through conduit 30 by means of condensate pump 24A interposed in the conduit 30. The pump 24A may be driven by a belt 24B passing over a pulley on a power take off shaft 24C of the engine.

The condenser 33 is disposed below the turbine 28 and within the cylindrical open ended supporting frame 15, through which the cooling air may flow upwardly as indicated by the arrows 25. In other words, the wind wheel 26 mounted on the turbine shaft 27 induces a flow of air which travels upwardly past the condenser 33.

The low pressure turbine 28 is thus driven by low pressure steam delivered to its inlet 29 from the annular space 19 through the conduits 23. The steam leaving the turbine outlet 31 enters the condenser inlet 32 and is all condensed in condenser 33, which has its condensate outlet 34 in communication with the intake of the condensate pump 24A which delivers such condensate to the liquid cooling circuit, namely, to conduit 24.

It is readily apparent that other means may be devised for returning the condensate from the condenser 33 to the liquid cooling circuit in a closed system as described above; and, that the particular means for accomplishing this result is thus merely exemplary of others which may be used for the same purpose.

Figure 2:
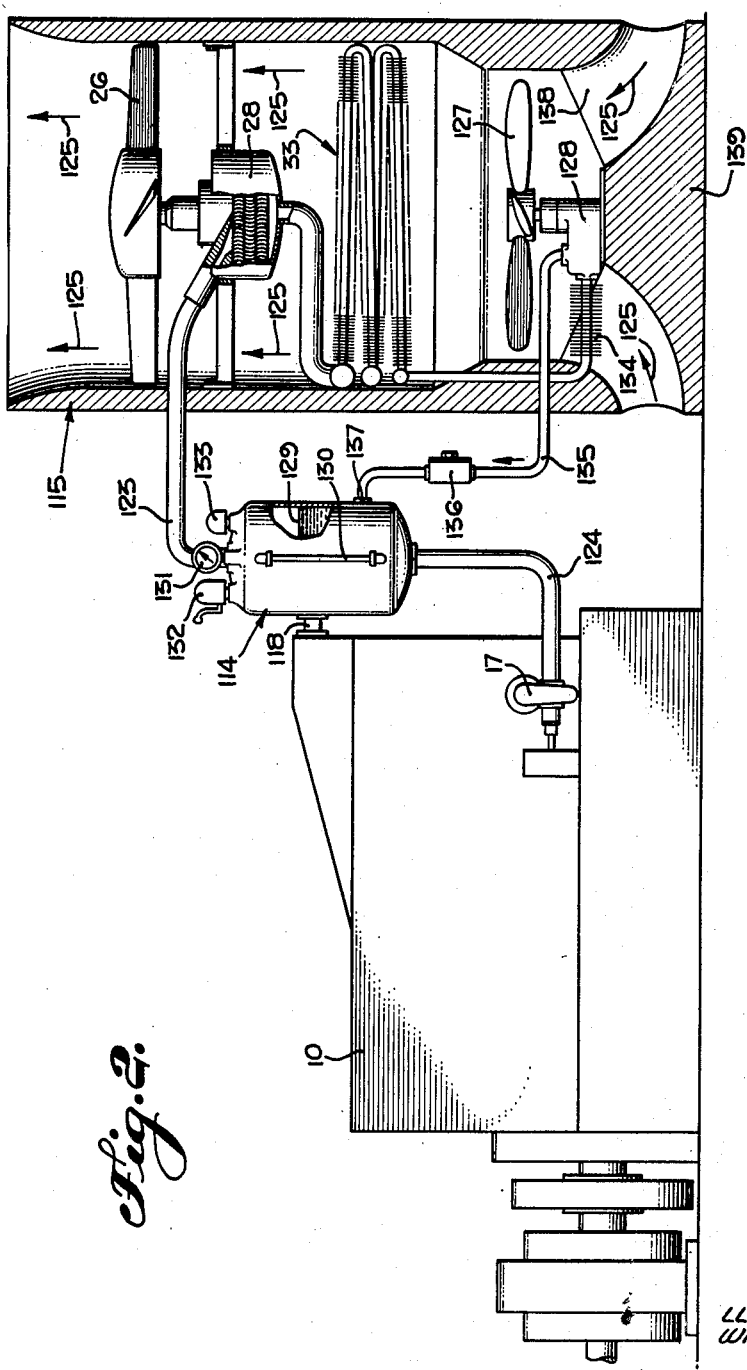
Figure 2 shows a modified system also embodying features of the present invention.

In the arrangement shown in Figure 2, a different expedient is used to return the condensate to the engine cooling circuit. In general, the steam turbine 28 is used to drive the fan 26, which causes an upward air flow as indicated by the arrows 125. This air flow serves not only to cool the condenser 33, but serves also to drive the air driven prime mover blades 127 which, in turn, drives the condensate pump 128, the inlet of which is in communication with the outlet of the condenser 33, and the outlet of such pump 128 is in communication with the water 129 in the boiler 114.

As in the arrangement in Figure 1, the cooling circuit for the engine 10 includes the conventional water jacket of such engine, the conduit 118, the flash boiler or steam separator 114, the liquid return conduit 124, and the hot water pump 17 which serves to pump the cooling water into the engine jacket. The steam separator 114 is provided with a conventional liquid level indicator 130 and a gauge 131, for purposes of indicating the steam pressure in the top of the boiler 114, it being noted that this separator 114 may be of the type described and claimed in the copending patent application of Robert R. Hull, Serial No. 162,993, filed May 19, 1950.

A conventional steam pressure relief valve 132 is associated with the boiler, as well as an air vent valve 133 of the type, for example, which is automatically closed when an element thereof is heated, as for example, by the steam in the boiler 114. When the engine is shut down the air vent 133 serves to place the upper level of the liquid in boiler or separator 114 in communication with the atmosphere to thereby equalize any pressure differentials.

It is thus apparent that in the operation of the arrangement shown in Figure 2, the steam from boiler 114 passing through the conduit 123 impinges on the blades of the turbine rotor 28 to cause the fan 26 to induce an upward flow of air through the stationary cylindrical structure 115, which mounts the turbine 28 and condenser 33. The steam leaving the outlet of the turbine 28 enters the condenser 33, and the condensate formed therein, after passing a second heat exchanger 134, enters the inlet of the condensate pump 128 which is driven by the air induced by rotation of fan 26. It is understood, of course, that if desired, the heat exchanger 134 may be eliminated, in which case the condensate from the outlet of the condenser 33 flows directly to the inlet of the condensate pump 128 without being cooled. The condensate entering the pump 128 is thus delivered through the conduit 135 and check valve 136 to the condensate inlet opening 137 of the boiler 114. It is noted that the heat exchanger 134 is in the direct path of air which flows radially inwardly and upwardly through the annular divergent orifice 138, which is provided by the spaced cylinder 115 and central stationary base 139 which supports the pump 128.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In an engine cooling system of the character described, an engine having a cooling jacket included in a liquid cooling circuit of limited heat dissipation whereby the liquid in the engine jacket is heated therein to substantially vaporizing temperatures in normal operation of the engine, said jacket having an inlet and an outlet, said circuit including a vapor separator having an inlet, a vapor outlet and a liquid outlet, said liquid outlet being in communication with said jacket inlet, said separator inlet being in communication with said jacket outlet, a low pressure turbine having its inlet in communication with the vapor outlet of said separator, a condenser having its inlet in communication with the turbine outlet and its condensate outlet in communication with said cooling circuit, and means driven by said turbine cooling said condenser.

2. In an engine cooling system of the character described, an engine having a cooling jacket included in a liquid cooling circuit of limited heat dissipation whereby the liquid in the engine jacket is heated therein to substantially vapor temperatures in normal operation of the engine, said circuit including a vapor separator wherein vapor is present, a turbine, said turbine having its inlet in communication with said separator, a condenser in communication with the outlet of said turbine, and means driven by said turbine cooling said condenser.

3. In an engine cooling system of the character described, an engine having a cooling jacket included in a liquid cooling circuit of limited heat dissipation whereby the liquid in the engine jacket is heated therein to substantially vapor temperatures in normal operation of the engine, said circuit being in communication with a chamber wherein steam may be present, a condenser having its inlet in communication with said chamber and its condensate outlet in communication with said cooling circuit, a turbine driven with vapor supplied from said chamber, and a fan driven by said turbine and producing a cooling stream of air past said condenser.

4. In an engine cooling system of the character described, an engine having a cooling jacket included in a liquid cooling circuit of limited heat dissipation whereby the liquid in said jacket is heated therein to vapor temperatures in normal operation of the engine and vapor is formed, a turbine in communication with said circuit and driven by vapor produced by engine heat rejected to the jacket, condenser means having its vapor inlet in communication with the turbine outlet and having its condensate outlet in communication with said circuit, and means driven by said turbine and cooling said condenser.

5. In an engine cooling system of the character described, an engine having a cooling jacket included in a liquid cooling circuit of limited heat dissipation whereby the liquid in said jacket is heated therein to vapor temperatures in normal operation of the engine and vapor is produced thereby in said circuit, a condenser having its vapor inlet connected to said circuit to receive vapor produced therein, the condensate outlet of said condenser being in communication with said circuit to return the condensate thereto, a steam turbine in communication with said circuit, and means driven by said turbine cooling said condenser.

6. In an engine cooling system of the character described, an engine having a cooling jacket included in a liquid cooling circuit of limited heat dissipation whereby the liquid in said jacket is heated therein to vapor temperatures in normal operation of the engine, said liquid cooling circuit including a chamber wherein steam is produced by the heat rejected by said engine, a steam condenser, a steam turbine having its inlet connected to said chamber and its outlet connected to said condenser, means driven by said turbine and producing a cooling stream of air past said condenser, and means returning the condensate from the condenser to said liquid cooling circuit.

7. The invention defined in claim 6 characterized by the fact that the last mentioned means comprises a condensate pump with an air driven prime mover which is rotated in accordance with the velocity of said cooling stream of air past said condenser.

8. The invention defined in claim 6 characterized by the fact that the last mentioned means comprises a condensate pump driven by the engine.

9. In an engine cooling system of the character described wherein an engine has a cooling jacket included in a liquid cooling circuit of limited heat dissipation whereby the liquid in said jacket is heated therein to vapor temperatures in normal operation of the engine, said engine being subject to different loadings to correspondingly increase the amount of heat rejected to said jacket, said liquid cooling circuit including a chamber wherein steam is produced by the heat rejected by said engine, a steam turbine driven by said steam within said chamber, the pressure of said steam within said chamber tending to increase with increased loading of the engine to thereby increase the speed of the turbine driven thereby, a condenser connected to condense steam formed within said chamber, means driven by said turbine at speeds varying in accordance with loading of the engine arranged to cool said condenser correspondingly increased amounts whereby said condenser is cooled in increased amounts as the loading of the engine is increased to thereby counteract the tendency of the steam pressure within said chamber to increase.

10. In an engine cooling system of the character described wherein an engine has a cooling jacket included in a liquid cooling circuit of limited heat dissipation whereby the liquid in said jacket is heated therein to vapor temperatures in normal operation of the engine, said cooling circuit including a chamber wherein steam is produced in increased amounts in accordance with increased loading of said engine, and wherein a steam condenser serves to condense the steam within said chamber and return the resulting condensate to said liquid cooling circuit, the improvement which resides in providing means for cooling said condenser in increased amounts in accordance with increased loading of said engine whereby the tendency of the steam pressure in said chamber to increase is counteracted, said cooling means comprising a steam turbine supplied with steam from said steam chamber and driven at a speed which varies with the steam pressure in said chamber and means driven by said steam turbine for inducing a stream of cooling medium in heat transfer relationship to said condenser to cool the same.

11. In an engine cooling system of the character described, an engine having a cooling jacket included in a liquid cooling circuit of limited heat dissipation whereby the liquid in said jacket is heated therein to vapor temperatures in normal operation of the engine said liquid cooling circuit including a chamber wherein steam is produced by the heat rejected by said engine, a steam condenser, a steam turbine having its inlet connected to said chamber and its outlet connected to said condenser, means driven by said turbine and producing a cooling stream of air past said condenser, means returning the condensate from the condenser to said liquid cooling circuit, said condensate returning means comprising a condensate pump with an air driven prime mover which is rotated in accordance with the velocity of said cooling stream of air past said condenser, and a check valve interposed between the outlet of said condensate pump and said liquid cooling circuit for preventing flow of liquid from said liquid cooling circuit to said condensate pump.

12. In an engine cooling system of the character described wherein an engine has a cooling jacket included in a liquid cooling circuit of limited heat dissipation whereby the liquid in said jacket is heated therein to vapor temperatures in normal operation of the engine, said cooling circuit including a chamber wherein steam is produced in increased amounts in accordance with increased loading of said engine, and wherein a steam condenser serves to condense the steam within said chamber and return the resulting condensate to said liquid cooling circuit, the improvement which resides in providing means for cooling said condenser in increased amounts in accordance with increased loading of said engine whereby the tendency of the steam pressure in said chamber to increase is counteracted, said cooling means comprising: a turbine driven at a speed which varies with the steam pressure in said chamber, and means driven by said turbine for cooling said condenser.

LLOYD C. HARBERT.
WILLIAM G. COREY.

References Cited in the file of this patent

UNITED STATES PATENTS

| Number | Name | Date |
|---|---|---|
| 2,147,993 | Scheibe | Feb. 21, 1939 |

FOREIGN PATENTS

| Number | Country | Date |
|---|---|---|
| 7,069 | Great Britain | of 1889 |
| 7,335 | Great Britain | of 1900 |
| 410,199 | Great Britain | of 1934 |
| 500,953 | Great Britain | of 1939 |
| 546,784 | Great Britain | of 1942 |
| 52,417 | France | Jan. 10, 1944 |
| | (Addition to No. 888,045) | |
| 222,617 | Switzerland | Oct. 16, 1942 |